July 2, 1946.  W. C. SPEAR ET AL  2,403,156
ELECTRIC MOTOR CONTROL
Filed Dec. 30, 1942
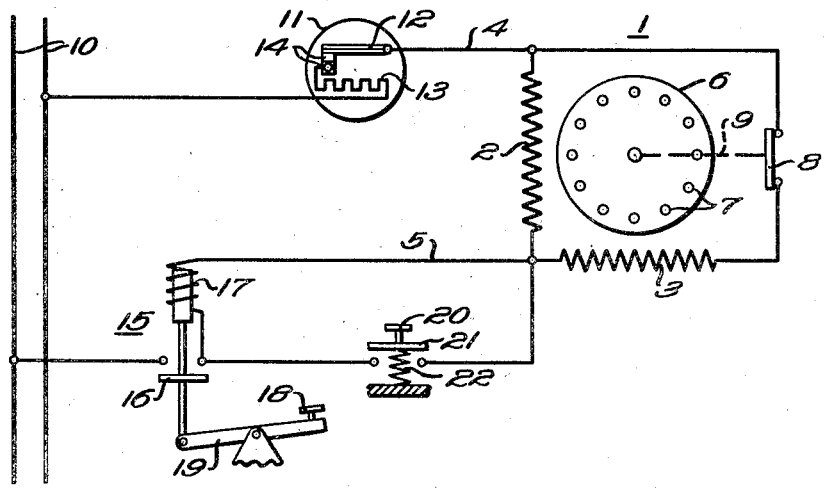
WITNESSES:
Robert C. Baird
F. C. Lyle
INVENTORS.
Wendell C. Spear and
Langdon C. Schaefer.
BY
O. B. Buchanan
ATTORNEY Patented July 2, 1946

2,403,156

UNITED STATES PATENT OFFICE 2,403,156

ELECTRIC MOTOR CONTROL

Wendell C. Spear, Wapakoneta, Ohio, and Langdon C. Schaefer, Honolulu, Territory of Hawaii, assignors to Westinghouse Electric Corporation, East Pittsburgh, Pa., a corporation of Pennsylvania Application December 30, 1942, Serial No. 470,570

5 Claims. (Cl. 175—294)

The present invention relates, in general, to the control and protection of electric motors and, more particularly, to a simple and inexpensive means for controlling the operation of small electric motors, and for providing overload protection for such motors.

There are many applications for electric motors of relatively small size, such as in domestic appliances, in which it is important that the control of the motor shall be simple and of low cost. In many such applications, it is also necessary or desirable to provide overload protection for the motor which will disconnect it from the line in response to excessive motor current, or other abnormal conditions. Thermally-responsive protective devices are usually used for this purpose, and such devices may either be of the manually reset type, in which the circuit remains open until the protective device is manually reclosed by the operator, or they may be of the automatically reset type, in which the protective device recloses its contacts as soon as it has cooled. In many types of equipment, such as washing machines, the motor is necessarily mounted in a relatively inaccessible location, and the manually reset type of protective device cannot satisfactorily be used since it is not readily accessible to the operator if it is mounted on the motor in the usual manner, and if it is mounted at a point remote from the motor so as to be readily accessible, it does not afford complete protection for all types of abnormal conditions as it is not subjected to heating directly by the motor. The use of automatically reset protective devices on equipment such as washing machines, however, involves an element of danger, since after such a protective device has operated and stopped the motor, it may cause the motor to restart unexpectedly at a time when the operator is in contact with a moving part of the machine. Thus, neither type of protective device when used in the conventional way is entirely satisfactory for such applications as washing machine motors.

The principal object of the present invention is to provide a simple and inexpensive means for controlling the operation of electric motors of relatively small size.

Another object of the invention is to provide a simple push-button type of control for effecting the starting and stopping of electric motors which is applicable to any type of small motor.

A further object of the invention is to provide a simple manually operable control means for small electric motors in which a protective device of the automatically reset type is utilized, but in which the motor cannot restart after the protective device has operated until it is again started by the operator.

A still further object of the invention is to provide a manually operable control means for small electric motors which includes a thermally-responsive protective device which can be mounted directly on the motor so as to afford the maximum protection, and in which the operation of the system is such that it must be manually actuated after operation of the protective device before the motor will restart, so that the operation is similar to that of the conventional manually reset protective device of the prior art, but the protective device can be mounted directly on the motor regardless of its accessibility, and the operation can be controlled at a point remote from the motor.

Other objects and advantages of the invention will be apparent from the following detailed description, taken in connection with the accompanying drawing, the single figure of which is a schematic diagram showing a preferred embodiment of the invention.

The invention is shown in the drawing as applied to the control of a single-phase electric motor I of the split-phase type. The motor I has a main or running winding 2, and an auxiliary or starting winding 3, which are physically displaced from each other on the stator of the motor, and which are designed so that their currents are displaced in phase. The windings 2 and 3 are connected in parallel to the terminals 4 and 5 of the motor. The motor also has a rotor member 6 which carries a suitable secondary winding, illustrated as a squirrel-cage winding 7 of the usual type. The auxiliary winding 3 is connected to the motor terminal 4 through a speed-responsive switch 8, which may be a centrifugal switch actuated from the rotor, as indicated by the dotted connection 9, to disconnect the auxiliary winding 3 when the motor has reached a predetermined speed. The motor I has been shown as a split-phase motor of the type in which the phase displacement between the currents in the main and auxiliary windings is obtained by the design of the windings, but it is to be understood that the invention may be used equally well for the control of any other type of single-phase motor, such as the capacitor-start type, and is also applicable to other types of small motors, such as direct-current and series or universal motors.

The motor terminals 4 and 5 are adapted to be connected to a single-phase supply line 10, from which the motor 1 is energized. In the illustrated embodiment, the terminal 4 is connected to the line through a thermally-responsive protective device 11. This protective device is preferably of the automatically reset type and may consist of a bimetallic element 12 and a heating element 13. The protective device 11 has normally closed contacts 14 which are connected in series with the motor terminal 4, and the heating element 13 is also connected in series with the terminal 4 and is disposed so that the bimetallic element 12 is subjected to the heat generated by the heating element 13. Thus, since the heating element 13 carries the line current and the bimetallic element 12 is heated by the element 13, the protective device can be adjusted so that the bimetallic element 12 will open the contacts 14 in response to heating caused by excess current of a predetermined value, and thus the motor is protected against overloads. The protective device 11 is preferably mounted on the motor in the usual manner in direct heat-receiving relation to the motor windings, so that it will operate in response to abnormal conditions of the motor which may cause excessive heating without causing a sufficiently high line current to actuate the protective device.

The motor terminal 5 is connected to the supply line 10 through a contact device or relay 15. The relay 15 has a contact 16 which is biased to the open position by gravity, as shown in the drawing, or by a spring or other suitable means. The relay 15 also includes a holding coil 17 which is effective when energized to hold the contact 16 in its closed position. The holding coil 17 and contact 16 are connected in series between the motor terminal 5 and the line 10, so that when the contact 16 is closed, the motor is energized and the holding coil 17 is also energized to maintain the contact 16 in its closed position. The contact 16 is intended to be manually moved to closed position, and for this purpose, a push-button 18 is provided which is connected to the contact in any suitable manner, as by the pivoted link 19, so that when the push-button 18 is depressed, the contact 16 is moved to closed position.

A stop push-button 20 is also provided having a contact 21 which is normally maintained in open position, as by means of a spring 22, and which is adapted to close its contact 21 when it is depressed. The contact 21 is connected directly across the coil 17, as clearly shown in the drawing, so that when the push-button 20 is depressed to close the contact 21, the coil 17 is short-circuited and is thus deenergized to permit the contact 16 to open.

The operation of this control means should now be apparent. In normal operation, the contacts 14 of the protective device 11 remain closed, so that the motor terminal 4 is normally connected to the line 10 at all times. When the motor is at rest, with the contact 16 open, as shown in the drawing, the motor is started simply by depressing the push-button 18. This moves the contact 16 to closed position and thus connects the motor terminal 5 to the line, so that the motor starts. Since the coil 17 is in series with the terminal 5, the coil is energized and holds the contact 16 closed after the operator releases the push-button 18. Thus, the connection of the motor to the line is maintained, and it continues to run. In order to stop the motor, the push-button 20 is momentarily depressed, closing the contact 21 and short-circuiting the coil 17. This deenergizes the coil, and the contact 16 immediately moves to its open position under the influence of gravity, or other suitable biasing means. Thus, a simple push-button control of the motor 1 is provided.

In case an overload or other abnormal condition occurs during operation of the motor, causing excessive motor current, or excessive heating, the protective device 11 opens its contacts 14 in response to the heat produced by the heating element 13, or received directly from the motor, and thus disconnects the motor terminal 4 from the line 10, causing the motor to stop. The opening of the contacts 14 deenergizes the motor and thus also deenergizes the holding coil 17, which is in series with the motor terminal 5, so that the contact 16 moves to its open position, thus interrupting the motor circuit at that point also. As soon as the protective device 11 has cooled, it will reclose its contacts 14, but since the contact 16 is also open, the motor will not restart and the reclosing of the contacts 14 has no effect. When it is desired to restart the motor after operation of the protective device, it can be started as soon as the contacts 14 have reclosed by depressing push-button 18, which causes the motor to start as described above.

It will be apparent, therefore, that a simple manually operated push-button type of control has been provided for effecting the starting and stopping of small electric motors, such as are used in domestic appliances. This control system is applicable to any type of small motor, either alternating current or direct current, and it may be used either with or without the protective device, although in most cases it is preferable to provide some degree of protection for the motor. When used with the automatically reset type of protective device, such as described above, the new control system has the great advantage that the motor will not restart unexpectedly after operation of the protective device, since operation of the protective device also effects interruption of the motor circuit at another point, and the motor cannot restart until the circuit is reestablished by the operator. This is a decided advantage in such applications as washing machine motors, where considerable danger might exist if the motor could restart unexpectedly, and where it must necessarily be placed in a relatively inaccessible location so that the conventional type of manually reset protective device cannot satisfactorily be used. The control equipment, consisting of the relay 15 and push-buttons 18 and 20, is quite inexpensive, and may be of relatively small size, and it can readily be mounted at any convenient location and at any necessary distance from the motor itself without affecting the operation of the system.

A preferred embodiment of the invention has been shown and described for the purpose of illustration, but it is to be understood that the invention is not limited to this exact arrangement, since it is capable of various other embodiments and modifications. The invention, therefore, is not restricted to the particular arrangement shown, but in its broadest aspects, it includes all equivalent embodiments and modifications which come within the scope of the appended claims.

We claim as our invention:

1. In combination, an electric motor having terminals adapted to be connected to a source of electrical energy, manually actuable contact means in series with one of said motor terminals for effecting connection of said motor terminal to said source of energy, a holding coil effective when energized to maintain said contact means in its actuated position with said motor terminal connected to said source of energy, said holding coil being connected in series with said contact means so as to be energized when the contact means is actuated, means for effecting deenergization of the holding coil, and a protective device for the motor, said protective device having contacts in series with one of said motor terminals and being adapted to actuate its contacts in response to an abnormal condition of the motor to directly effect disconnection of the motor from the source of energy independently of the contact means and to effect deenergization of said holding coil.

2. In combination, an electric motor having terminals adapted to be connected to a source of electrical energy, a contact device in series with one of said motor terminals for effecting connection of said motor terminal to said source of energy, said contact device including manually operable means for actuating the contact device to closed position to effect said connection, the contact device also including a holding coil effective when energized to maintain the contact device in its closed position, said holding coil being connected in series with said motor terminal so as to be energized in response to actuation of the contact device, a protective device for the motor, said protective device having contacts in series with one of the motor terminals and being adapted to open its contacts in response to excess motor current, thereby disconnecting the motor from the source of energy independently of the contact device and deenergizing the holding coil, and other means independent of the protective device for effecting deenergization of the holding coil.

3. In combination, an electric motor, circuit connections for connecting said motor to an electric supply line, a thermally-responsive protective device having contacts interposed in said circuit connections so that opening of the contacts effects interruption of said circuit connections to deenergize the motor, said protective device being adapted to open its contacts in response to heating caused by excess motor current and to reclose its contacts upon cooling of the protective device, contact means interposed in said circuit connections at another point, manually operable means for actuating said contact means to closed-circuit position to effect completion of said circuit connections, a holding coil effective when energized to maintain said contact means in closed-circuit position, said holding coil being connected in series in said circuit connections so as to be energized when said contact means and the contacts of said protective device are both in closed position, and means for deenergizing said holding coil to effect stopping of the motor.

4. In combination, an electric motor having terminals adapted to be connected to a source of electrical energy, contact means in series with one of said motor terminals for effecting connection of the motor terminal to said source of energy, manual means for moving said contact means to closed-circuit position, a holding coil for holding the contact means in closed-circuit position, said holding coil being connected in series with one of the motor terminals so as to be energized whenever the motor is energized, manual means for effecting deenergization of the holding coil, and a thermally-responsive protective device having normally closed contacts, said protective device being adapted to open its contacts in response to heating caused by an abnormal condition of the motor and to reclose its contacts upon cooling, the contacts of said protective device being connected in series with one of said motor terminals to effect deenergization of the motor and of the holding coil when the contacts open, the holding coil being so connected that it is not reenergized by reclosing of the contacts of the protective device.

5. In combination, an electric motor having terminals adapted to be connected to a source of electrical energy, contact means in series with one of said motor terminals for effecting connection of the motor terminal to said source of energy, manual means for moving said contact means to closed-circuit position, a holding coil for holding the contact means in closed-circuit position, said holding coil being connected in series with the contact means on the motor side thereof so as to be energized whenever the motor is energized, manual means for effecting deenergization of the holding coil, and a thermally-responsive protective device having normally closed contacts, said protective device being adapted to open its contacts in response to heating caused by an abnormal condition of the motor and to reclose its contacts upon cooling, the contacts of said protective device being connected in series with one of said motor terminals to effect deenergization of the motor and of the holding coil when the contacts open.

WENDELL C. SPEAR.
LANGDON C. SCHAEFER.